(12) United States Patent
Andriessen

(10) Patent No.: US 6,787,064 B2
(45) Date of Patent: Sep. 7, 2004

(54) PREPARATION OF ZNS PARTICLES DOPED WITH COPPER

(75) Inventor: Hieronymus Andriessen, Beerse (BE)

(73) Assignee: AGFA Gevaert, Mortsel (BE)

( * ) Notice: Subject to any disclaimer, the term of this patent is extended or adjusted under 35 U.S.C. 154(b) by 58 days.

(21) Appl. No.: 10/050,317

(22) Filed: Jan. 16, 2002

(65) Prior Publication Data

US 2002/0179922 A1 Dec. 5, 2002

Related U.S. Application Data

(60) Provisional application No. 60/271,127, filed on Feb. 23, 2001.

(30) Foreign Application Priority Data

Feb. 7, 2001 (EP) .............................. 01000009

(51) Int. Cl.[7] .......................... C09K 11/56; C09K 11/58
(52) U.S. Cl. ................................. 252/301.6 S
(58) Field of Search .................... 252/301.6 S; 313/503

(56) References Cited

U.S. PATENT DOCUMENTS 4,143,297 A * 3/1979 Fischer ....................... 313/502
6,090,200 A * 7/2000 Gray et al. .................... 117/68
2002/0151094 A1 * 10/2002 Andriessen ................... 438/29
2002/0153830 A1 * 10/2002 Andriessen ................. 313/498

OTHER PUBLICATIONS

European Patent Office, European Search Report, Aurthor—Drouot–Onillon, Application No. 01 00 0009, publication date Jul. 10, 2001.
Patent Abstracts of Japan, Publication No. 04023886, vol. 016, No. 183(C–0936), May 6, 1992, (1992–5–6).
Database Chemlabs 'Online!, Chemical Abstracts Service, Columbus Oh, Peters, Robert W. et al: "The effect of tartrate, a weak complexing agent, on the removal of heavy metals by sulfide and hydroxide precipitation" Database accession No. 111:120250 CA XP002171540, Abstract, published 1988.

* cited by examiner

Primary Examiner—C. Melissa Koslow
(74) Attorney, Agent, or Firm—Joseph T. Guy; Nexsen Pruet, LLC

(57) ABSTRACT

An improved method for the preparation of a dispersion of ZnS particles doped with copper is disclosed. The method comprises the step of performing a precipitation by mixing together a zinc salt, a sulfide, and a citrate or EDTA complex of copper ions, dissolved in several aqueous solutions. Enhanced luminescence is obtained.

14 Claims, No Drawings

PREPARATION OF ZNS PARTICLES DOPED WITH COPPER

The application claims benefit of Provisional Application No. 60/271,127, filed Feb. 23, 2001.

FIELD OF THE INVENTION

The present invention relates to a method for preparing a dispersion of ZnS particles doped with copper ions showing enhanced luminescence.

BACKGROUND OF THE INVENTION

Luminescence of sulfides, selenides and tellurides of Zn, Sr, Cd, Hg, and others, is due to the presence of luminescent centres in the host crystal. For instance, $Cu^+$ centres in ZnS give rise to luminescence at 520 nm. $Mn^{2+}$ is also a luminescent centre for ZnS. The emission maximum in this case is situated at about 590 nm.

The method that is usually applied for the preparation of (electro) luminescent particles is the sintering method. In this procedure bulk ZnS and e.g. MnS are mixed and sintered at high temperature (>700° C.) under $H_2S$ atmosphere. As a result the $Mn^{2+}$ ions diffuse in the ZnS lattice. In a next step the resulting ZnS:Mn pieces are milled to fine particles. The disadvantages of this method are the high temperature needed, the $H_2S$ atmosphere, and the large final average particle size (5–20 µm).

Recently, scientific literature[1-9] mentions luminescent ZnS:Mn nanoparticles prepared according to the homogeneous precipitation method. This method allows the building in of luminescent Mn2+ centres in a simple way. In this method a homogeneous solution containing $Zn^{2+}$ and $Mn^{2-}$ ions is mixed with a solution of sulfide ions. In this way luminescent nanoparticles of ZnS:Mn originate.

The solubility of ZnS (sfalerite) in cold water is $6.9 \times 10^{-4}$ g/l while the solubility of MnS is $4.7 \times 10^{-3}$ g/l, which makes no big difference. Moreover, MnS is well homogeneously mixable with ZnS up to 40 mol %. As a result doped ZnS:Mn particles can be simply prepared according to the homogeneous precipitation method.

The situation is completely different when one intends to build in $Cu^+$ ions. Doping of ZnS with $Cu^+$ gives rise to emission at 485 nm. The solubility of $Cu_2S$ in cold water is $10^{-13}$ g/l which is several orders of magnitude lower than the one of ZnS. Also the solubility of $Cu^+$ in a ZnS lattice is limited. The maximal concentration amounts to only 0.05% vis-à-vis the ZnS. Therefore, when using the homogeneous precipitation method, there is a big chance that a separate phase of $Cu_2S$ nuclei or particles is formed apart from the ZnS. A way of preparing yet luminescent ZnS:Cu nanoparticles uses the heterogeneous precipitation method. In this method one uses micellar particles in petroleum ether filled with aqueous solutions of $Zn^{2+}$ and $Cu^+$ on the one hand and $S^{2+}$ on the other hand. Apparently the kinetics and/or thermodynamics of the precipitation are changed in such a way that luminescent ZnS:Cu particles are still formed.

Another way is to lean only on the kinetics. $Cu^+$ can form a complex, so that the the $Cu^+$ ions are only slowly liberated in the precipitation reaction. As a result isolated building in of $Cu^+$ in ZnS becomes possible. An example is described by Sun[10]: in this case thiourea or thiosulphate are used as complexants.

The present invention extends the teachings on the preparation of luminescent ZnS:Cu particles.

References (1) Eshuis A.; van Elderen G. R. A.; Koning C. A. J.; Colloids and Surfaces A: Physicochemical and Engineering Aspects (1999), 151, 505–512.
(2) Gallagher, D.; Heady, W. E.; Racz, J. M.; Bhargava, R. N.; J. Mater. Res. (1995), 10(4), 870–6.
(3) Murase, N.; Jagannathan, R.; Kanematsu, Y.; Watanabe, M.; Kurita, A.; Hirata, K.; Yazawa, T.; Kushida, T.; J. Phys. Chem. B (1999), 103(5), 754–760.
(4) Vacassy, Robert; Scholz, Stefan M.; Dutta, Joydeep; Plummer, Christopher John George; Houriet, Raymond; Hofmann, Heinrich; J. Am. Ceram. Soc. (1998), 81(10), 2699–2705.
(5) Yu, I.; Isobe T.; Senna M.; J. Phys. Chem. Solids (1996), 57(4), 373–379.
(6) Que, Wenxiu; Zhou, Y.; Lam, Y. L.; Chan, Y. C.; Kam, C. H.; Liu, B.; Gan, L. M.; Chew, C. H.; Xu, G. Q.; Chua, S. J.; Xu, S. J.; Mendis, F. V. C.; Appl. Phys. Lett. (1998), 73(19), 2727–2729.
(7) Xu, S. J.; Chua, S. J.; Liu, B.; Gan, L. M.; Chew, C. H.; Xu, C. Q. Appl. Phys. Lett. (1998), 73(4), 478–480.
(8) Gan, L. M.,; Liu, B.; Chew, C. H.; Xu, S. J.; Chua, S. J.; Loy, G. L.; Xu, G. Q.; Langmuir (1997), 13(24), 6427–6431.
(9) Leeb, J.; Gebhardt, V.; Mueller, G.; Haarer, D.; Su, D.; Giersig, M.; McMahon, G.; Spanhel, L. Institut fuer Silicatchemie, Universitaet Wuerzburg, Wuerzburg, Germany. J. Phys. Chem. B (1999), 103(37), 7839–7845.
(10) Sun L.; Liu C.; Liao C.; Yan C.; Solid State Comm. (1999), 111, 483–488.

OBJECTS OF THE INVENTION

It is an object of the present invention to provide a method for the preparation of a dispersion of zinc sulfide particles doped with copper which show enhanced luminescence.

It is a further object of the present invention to provide a Thin Film Inorganic Light Emitting Diode device with enhanced luminescence.

SUMMARY OF THE INVENTION

The above mentioned objects are realised by providing a method for the preparation of a dispersion of zinc sulfide particles doped with copper (ZnS:Cu), said method comprising the step of performing a precipitation by mixing together a zinc salt, a sulfide, and a citrate or EDTA complex of copper ions, dissolved in several aqueous solutions.

After the precipitation the ZnS:Cu particles are preferably washed, preferably by a diafiltration and/or an ultrafiltration treatment.

The thus obtained ZnS:Cu dispersion can be coated as a layer making part of an (electro)luminescent device such as a Thin Film Inorganic Light Emitting Diode device (ILED).

DETAILED DESCRIPTION OF THE INVENTION

It is the essence of the present invention that a precipitation step is performed by mixing together aqueous solutions containing a zinc salt, a sulfide and a citrate or EDTA complex of copper ions respectively, whereby the cited dissolved ingredients can be distributed over the different aqueous solutions in various ways.

In a preferred embodiment the precipitation is performed according to the double jet principle whereby a first solution containing the zinc salt and a second solution containing the sulfide are added simultaneously to a third solution.

Self-evidently the zinc salt must be a water-soluble zinc salt such as zinc sulphate. A suitable sulfide is sodium sulfide. The copper ions are preferably monovalent copper (I) ions. The copper complex emanates from the combination of a copper salt, preferably CuCl, and a citrate, e.g. ammonium citrate, or an EDTA salt, e.g. the tetra-sodium salt. The citrate or EDTA complex of the copper ions can be incorporated in the first solution together with the is zinc salt, or it can be present in the third aqueous solution. The copper complex can also be distributed over the first and third solutions. When the copper complex is present in the third solution the first solution can also contain an additional amount of non-complex copper salt, e.g. CuCl, and vice versa. Moreover, in a further alternative embodiment, although not preferred, the copper complex can be added to the third solution via a separate fourth solution.

The third solution preferably contains a small amount of the zinc salt, e.g. zinc sulphate, and of the anions of the copper salt, e.g. chloride ions.

After the end of the preciptation step the reaction mixture is preferably subjected to a wash treatment, preferably a diafiltration and/or ultrafiltration treatment. This diafiltration and/or ultrafiltration treatment is preferably performed in the presence of a compound preventing agglomeration of the doped ZnS particles.

Preferred compounds are polyphosphoric acid or a polyphosphate such as sodium polyphosphate, a hexametaphosphate such as sodium hexametaphosphate, glycerol and thioglycerol. The most interesting compounds are the phosphates because they are odourless. The compound is preferably added partly to the predispersion after precipitation and before diafiltration, and partly in the diafiltration liquid.

The dispersion of ZnS:Cu prepared according to the present invention can be used in the form of a coated layer in the construction of an electroluminescent device, more particularly in a so-called Thin Film Inorganic Light Emitting Diode. In such a device the layer capable of luminescence and comprising the Zns:Cu dispersion prepared according to the present invention is inserted between two conductive electrodes, of which at least one is transparent.

The first conductive layer is preferably an ITO (Indium Tin Oxide) electrode. An ORGACON conductive foil (trade name of Agfa-Gevaert N.V.) can also be used. Thin transparent electrodes of evaporated Ag, Au, . . . can also be used. The transparent electrode is preferably applied on top of a plastic substrate, e.g. a polyester substrate such as a polyethylene terephthalate substrate, but a glass substrate can also be used. In case the top-electrode (second electrode) is transparent, a non-transparent electrode on glass or plastic can also be used (e.g. Al, Ca, Ag, Mg, Au, etc.) as first electrode.

The coating composition, comprising the ZnS:Cu dispersion and optionally a surfactant and/or a binder, can be applied on top of the first conductive electrode by any suitable coating technique. For the manufacturing of a small prototype spincoating is mostly preferred, but for larger areas doctor blade coating or continuous coating techniques such as used in photographic emulsion coating like air knife coating or curtain coating can be used. The obtained thickness of the dispersion layer(s) is dependent from the nature and concentration of the binder, and from the coating conditions. This thickness is preferably between 50 and 1000 nm.

Finally, a second conductive electrode is applied on top of the coated layer. At least one of the two conductive electrodes must be transparent. In a preferred embodiment the second conductive electrode is an aluminum electrode (cathode) applied by vacuum deposition. Also Ca, Mg, LiF/Al, Ag can be used. In case the bottom electrode used is non-transparent (Al, Ag, . . . ) a transparent electrode should be applied on top of the spincoated doped ZnS layer. This can be done e.g. by spincoating a dispersion comprising a poly(3,4,-ethylenedioxythiophene polystyrene sulphonate (PEDOT/PSS) complex, or by sputtering an ITO layer on top of it, or by evaporation of a thin and transparent conductive metallic layer like Al, Ag, Au, . . .

The present invention will now be illustrated by the following examples without however being limited thereto.

EXAMPLES

Example 1

Preparation of ZnS:Cu Dispersion 1 (Control)

The following solutions were prepared:

| Solution 1 | |
|---|---|
| $Zn(SO_4).7H_2O$ | 905.8 g |
| CuCl | 0.15 g |
| Water | to 1500 ml |
| Solution 2 | |
| $Na_2S.9H_2O$ | 560.8 g |
| $NH_3$ (25% in water) | 24.4 ml |
| Water | to 1500 ml |
| Solution 3 | |
| $Zn(SO_4).7H_2O$ | 21.6 g |
| KCL | 100 g |
| Water | to 1500 ml |

The ZnS:Cu dispersion was prepared as follows:

To solution 3, held at room temperature and stirred at 1500 rpm, solution 1 and solution 2 were added simultaneously at room temperature at a flow rate of 500 ml/min.

To this predispersion, 250 ml thioglycerol was added and this dispersion was diafiltrated through a Fresenius F60 cartridge by using a 5% solution of thioglycerol in water. This dispersion could be washed successfully until a conductivity of 0.5 mS/cm was reached.

This dispersion showed no luminescence upon radiation at wavelengths between 250–350 nm.

Example 2

Preparation of the ZnS:Cu-dispersion 2 (Control)

The following solution was prepared:

| Solution 4 | |
|---|---|
| $Zn(SO_4).7H_2O$ | 905.8 g |
| CuCl | 0.15 g |
| Thioureuin | 58.7 g |
| DW | to 1500 ml |

The ZnS:Cu dispersion was prepared as follows:

To solution 3, held at room temperature and stirred at 1500 rpm, solution 4 and solution 2 were added simultaneously at room temperature at a flow rate of 500 ml/min.

To this predispersion, 250 ml thioglycerol was added and this dispersion was diafiltrated through a Fresenius F60 cartridge by using a 5% solution of thioglycerol in water.

This dispersion could be washed successfully until a conductivity of 0.5 mS/cm was reached.

This dispersion showed no luminescence upon radiation at wavelengths between 250–350 nm.

Example 3

Preparation of the Zn(Cu)S-dispersion 3 (Control)

The following solution was prepared:

| Solution 5 | |
| --- | --- |
| $Zn(SO_4).7H_2O$ | 905.8 g |
| CuCl | 0.15 g |
| Sodium thiosulphate | 58.7 g |
| Water | to 1500 ml |

The ZnS:Cu dispersion was prepared as follows:

To solution 3, held at room temperature and stirred at 1500 rpm, solution 5 and solution 2 were added simultaneouly at room temperature at a flow rate of 500 ml/min.

To this predispersion, 250 ml thioglycerol was added and this dispersion was diafiltrated through a Fresenius F60 cartridge by using a 5% solution of thioglycerol in water. This dispersion could be washed successfully until a conductivity of 0.5 mS/cm was reached.

This dispersion showed no luminescence upon radiation at wavelengths between 250–350 nm.

Example 4

Preparation of the Luminescent Zn(Cu)S-dispersion 4 (Invention)

The following solution was prepared:

| Solution 6 | |
| --- | --- |
| $Zn(SO_4).7H_2O$ | 905.8 g |
| CuCl | 0.15 g |
| Triammonium citrate (10% in water) | 400 ml |
| $NH_3$ (25% in water) | until clear solution |
| Water | to 1500 ml |

The ZnS:Cu dispersion was prepared as follows:

To solution 3, held at room temperature and stirred at 1500 rpm, solution 6 and solution 2 were added simultaneouly at room temperature at a flow rate of 500 ml/min.

To this predispersion, 250 ml thioglycerol was added and this dispersion was diafiltrated through a Fresenius F60 cartridge by using a 5% solution of thioglycerol in water. This dispersion could be washed successfully until a conductivity of 0.5 mS/cm was reached.

This dispersion showed a luminescence band at 510 nm upon radiation at wavelengths between 250–310 nm.

Example 5

Preparation of the Luminescent Zn(Cu)S-dispersion 5 (Invention

The following solution was prepared:

| Solution 7 | |
| --- | --- |
| $Zn(SO_4).7H_2O$ | 905.8 g |
| CuCl | 0.15 g |
| Tetra sodium EDTA (10% in water) | 400 ml |
| Water | to 1500 ml |

The ZnS:Cu dispersion was prepared as follows:

To solution 3, held at room temperature and stirred at 1500 rpm, solution 7 and solution 2 were added simultaneously at room temperature at a flow rate of 500 ml/min.

To this predispersion, 250 ml thioglycerol was added and this dispersion was diafiltrated through a Fresenius F60 cartridge by using a 5% solution of thioglycerol in water. This dispersion could be washed successfully until a conductivity of 0.5 mS/cm was reached.

This dispersion showed a luminescence band at 510 nm upon radiation at wavelengths between 250–310 nm.

Example 6

Preparation of Thin Film Inorganic Light Emitting Diodes on ORGACON™:

6.1 Making of the Coating Dispersions:

To the dispersion prepared according to example 5, a binder was added according to following table I, in order to stabilize further the dispersion and allow for an homogeneous coating.

TABLE I

| Coating dispersion | Dispersion B | Binder | Theoretical volume ratio ZnS/Polymer in the layer |
| --- | --- | --- | --- |
| 5.1 | 16.8 ml | 3.2 ml of a 5.8% polystrene sulfonic acid in water | 50/50 |
| 5.2 | 19.1 ml | 0.9 ml of a 5.8% polystrene sulfonic acid in water | 80/20 |
| 5.3 | 16.4 ml | 3.6 ml of a 5% Polyvinyl-pyrrolidone (LUVISKOL K-90; BASF) | 50/50 |
| 5.4 | 18.96 ml | 1.04 ml of a 5% Polyvinyl-pyrrolidone (LUVISKOL K-90; BASF) | 80/20 |

6.2. Preparation of the Thin Film Inorganic Light Emitting Diodes on ORGACON™:

The transparent conductive film ORGACON (coated poly (3,4-ethylenedioxythiophene)/polystyrene sulphonic acid complex on a PET substrate), trade mark of Agfa-Gevaert was used for the device construction. An ORGACON foil was cut into 6 cm×6 cm samples. Subsequently, the resist AZ7217 (Clariant) was spincoated on the samples and baked for 30 minutes at 90° C. The dry layer thickness was about 2–3 µm. This treatment was followed by an UV-exposure through a mask (ca 1 minute at 4 mW/cm²), in order to illuminate the middle part (6 cm×3 cm) of the resist. The sample was then given a prebake for 45 seconds at 110° C. and followed by a development step for 40 seconds in the AZ351B developer (Clariant). In order to obtain good adhesion a pre-exposure bake for 30 minutes at 110° C. was given. Subsequently, the non protected areas at the two borders were desactivated by dipping the sample in a 1% NaClO solution for 20 seconds. This step was followed by rinsing with water and drying. Then, a full plane exposure for 1 minute at 4 mW/cm$^2$ was given and the resist was removed by developing in isopropanol for 90 seconds. Subsequently, the samples were washed with water and dried. The resulting material comprises a conductive area (ca 1500 Ohm/Sq) in the middle of the material with dimensions 6 cm×3 cm.

Subsequently the coating dispersions of table 1 were spincoated on this substrate. The dry layer thickness varied between 150 and 400 nm depending on the binder and the rotation frequency of the spincoater. A 300 nm thick aluminum electrode (cathode) was vacuum deposited on the spincoated ZnS:Cu/binder layer at 10$^{-6}$ Torr through a mask. The emission area was 25 mm$^2$.

The device was driven at different direct current bias voltages. Table II lists the turn-on voltages at which blue-green electroluminescence around 490 nm was observed. The electroluminescence started as soon as currents of 5–15 mA were attained. This currents correspond to an exponential offset of the I/V-curve (diode behaviour). Life times are listed more quantitatively: A means EL light was only observed for less then 5 seconds, B means it was observed between 5 seconds and 3 minutes and C means that the electroluminecence could be observed for longer then 3 minutes.

TABLE II

Blue-green ILEDs on ORGACON

| Sample | Bias | Turn-on Voltage | EL Brightness | Life Time |
|---|---|---|---|---|
| 5.1 | + | 4 V | ++ | B |
| 5.2 | + | 4 V | ++ | A |
| 5.3 | + | 4 V | +++ | C |
| 5.4 | + | 4 V | +++ | A |

What is claimed is:

1. A method for the preparation of a dispersion of zinc sulfide particles doped with copper (ZnS:Cu), said method comprising the step of performing a precipitation by mixing together a zinc salt, a sulfide, and a citrate or EDTA complex of copper ions, dissolved in several aqueous solutions.

2. A method according to claim 1 wherein said precipitation is performed according to the double jet principle, whereby a first solution containing said zinc salt and said citrate or EDTA complex of copper ions, and a second solution containing said sulfide are added simultaneously to a third solution.

3. A method according to claim 1 wherein said copper ions are copper (I) ions.

4. A method according to claim 1 wherein said citrate or EDTA complex of copper ions is prepared by combining copper (I) chloride with a citrate or an EDTA salt.

5. A method according to claim 1 further comprising the step of subjecting the mixture formed by said recipitation step to a diafiltration and/or ultrafiltration treatment.

6. A method according to claim 5 wherein said diafiltration and/or ultrafiltration treatment is performed in the presence of a compound preventing agglomeration of said ZnS:Cu particles.

7. A method according to claim 2 wherein said copper ions are copper (I) ions.

8. A method according to claim 2 wherein said citrate or EDTA complex of copper ions is prepared by combining copper (I) chloride with a citrate or an EDTA salt.

9. A method according to claim 2 further comprising the step of subjecting the mixture formed by said precipitation step to a diafiltration and/or ultrafiltration treatment.

10. A method according to claim 9 wherein said diafiltration and/or ultrafiltration treatment is performed in presence of a compound preventing agglomeration of said ZnS:Cu particles.

11. A method according to any of claim 3 further comprising the step of subjecting the mixture formed by said precipitation step to a diafiltration and/or ultrafiltration treatment.

12. A method according to claim 11 wherein said diafiltration and/or ultrafiltration treatment is performed in the presence of a compound preventing agglomeration of said ZnS:Cu particles.

13. A method according to any of claim 4 further comprising the step of subjecting the mixture formed by said precipitation step to a diafiltration and/or ultrafiltration treatment.

14. A method according to claim 13 wherein said diafiltration and/or ultrafiltration treatment is performed in the presence of a compound preventing agglomeration of said ZnS:Cu particles.

* * * * *